May 30, 1961 K. G. MILLER 2,986,314
CARRYING YOKE
Filed Oct. 23, 1959

INVENTOR.
KEITH G. MILLER
BY
ATTORNEY

United States Patent Office 2,986,314
Patented May 30, 1961

2,986,314
CARRYING YOKE
Keith G. Miller, 154 Oak St., Binghamton, N.Y.
Filed Oct. 23, 1959, Ser. No. 848,334
2 Claims. (Cl. 224—5)

This invention relates to lifting and carrying accessories and, more particularly, to a carrying yoke worn on the shoulders of a person.

The carrying yoke has been, since time immemorial, a useful accessory for bearing heavy weights and carrying them long distances. Although it has long since been supplemented by the advance of power-operated devices, there are still instances, even in this automated society, for its use. Moreover, in places removed from the technological developments, it is still a tool in everyday use to lessen the burden of the toiling man.

Various improvements have been made in the simple beam balanced on the shoulders of the individual, each end carrying a given weight. When these weights are more or less equal, the thrust is properly distributed and the load may be carried with comparative ease, provided the terrain is flat. These ideal conditions are seldom encountered, and unequal loads at each end of the beam and unevenness of terrain place considerable hardship on the carrying person. I have often observed that in such cases the individual must use his arms placed over the beams in an effort to equalize the weight and to prevent shifting of the fulcrum of the balance.

It is accordingly a primary object of my invention to alleviate the above conditions by providing a yoke of improved construction.

It is a further object of my invention to provide means in a yoke for a better distribution of the forces acting upon the body.

It is a particular feature of my invention that the yoke constructed in accordance therewith is form-fitted to the human body.

Figure 1:
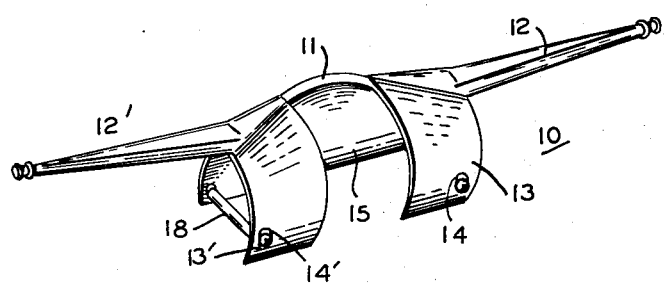
Figure 2:
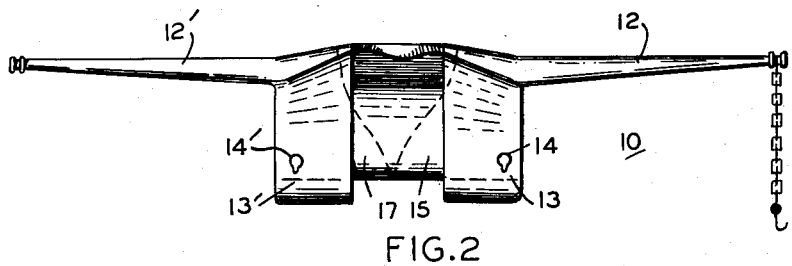
Figure 3:
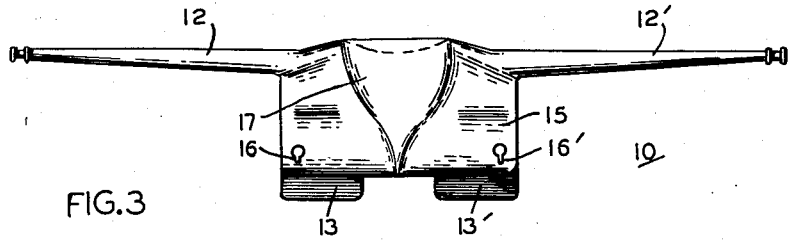
Figure 4:
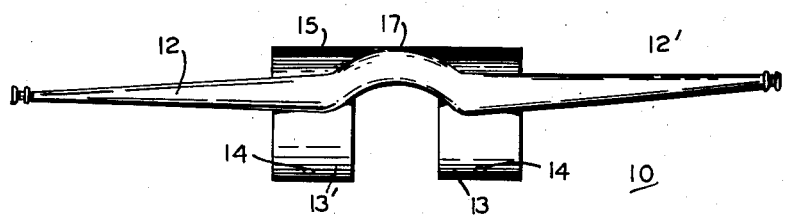

Other objects and features will be apparent from the following description of my invention, pointed out in particularity in the appended claims, and taken in connection with the accompanying drawing, in which:

Fig. 1 is a view in perspective of the yoke;
Fig. 2 is a front elevational view thereof;
Fig. 3 is a rear view of the yoke;
Fig. 4 is a top view thereof; and
Fig. 5 is a side view.

As seen in the figures, particularly Fig. 1, the yoke 10 is form-fitted to follow the contours of the body on which it rests. For this reason, and also for economy of manufacture, I prefer to construct the yoke from plastic material by means of a suitable molding process. Certain thermoplastic materials are well known to possess great strength combined with resiliency which make them ideally suited to replace wood or metals of various kinds. I have in mind the use of polyester resins, particularly epoxy resin with fiberglass reinforcement. A yoke molded of the latter material will have the advantage of lightness in weight combined with an adequate strength to support more weight than a man is capable of carrying.

Referring to the figures in detail, the yoke 10 comprises the curvilinear center portion 11 which is so dimensioned as to fit around the neck of the person and to rest mainly on the dorsal part thereof. From one end of the center portion 11 extends laterally the beam 12 and from the other end of the beam 12'. The length of each beam is the same from the center of the curved portion 11 although the combined length may vary according to the overall size of the yoke. The end of each beam 12 and 12' terminates in a flanged end piece for the attachment of a rope or chain, as the case may be, on which the load to be carried is suspended.

Figure 5:
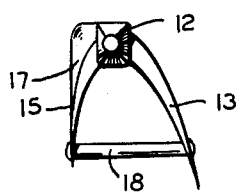

As in Figs. 1, 2 and 5, there are support means in the form of spaced breast plates 13 and 13' which extend downwardly and have a curvature to accommodate the body of the wearer. Each of these plates has a key slot 14 and 14', respectively, into which a cross piece may be inserted, as will be explained later. The back side of the yoke has a back plate 15 extending downwardly from the center portion 11, similarly curved to fit the shoulders of the wearer. The material of the plate 15 is reinforced in the middle by a mass in the form of a shield 17 to lend greater stability. Key slots 16 and 16' cut in the plate 15 correspond to those in the breast plate 13 and 13'.

Cross members 18 in the form of rods which may be of metal interconnect the breast plates 13 and 13' with the back plate 15, being inserted in the key slots above mentioned from which they are easily retractable. The members 18 fit under the armpits of the wearer.

In the use of the yoke, the cross members 18 are first removed and the yoke placed on the shoulder of the wearer, whereupon the cross members 18 are inserted. The curved back plate 15 and the similarly curved breast plates 13 and 13' which extend below the line of the back plate 15 give a firm grip around the shoulder, back and chest, respectively, of the wearer. The yoke cannot slide in any direction. The cross members 18 under the armpits permit a firm hold and allow the wearer to shift his weight and resist the tendency of the yoke to bounce when a more difficult path is negotiated, as for example, over a plank in a building construction.

I claim:

1. A carrying yoke to be worn on the shoulders of a person, including a curvilinear center portion fitting against the dorsal part of the neck, a beam extending laterally from each end of said portion, each of said beams terminating in a flanged portion for suspending thereon the weights to be carried, a back plate extending downwardly from the center portion and adapted to rest against the back of the person, a pair of spaced, curved breast plates extending downwardly from said center portion, adapted to rest on the chest of the person, and a pair of cross members interconnecting each of said breast plates with said back plates comprising rods having at each end a head of larger diameter, and key slots in said breast plates permitting retraction of said rods.

2. A carrying yoke to be worn on the shoulders of a person, including a curvilinear center portion fitting against the dorsal part of the neck, a beam extending laterally from each end of said portion, each of said beams terminating in a flanged portion for suspending thereon the weights to be carried, a back plate extending downwardly from the center portion and adapted to rest against the back of the person, a pair of spaced, curved breast plates extending downwardly from said center portion, adapted to rest on the chest of the person, and a pair of cross members interconnecting each of said breast plates with said back plates comprising rods having at each end a head of larger diameter, and key slots in said breast plates permitting retraction of said rods, said breast plates extending downwardly below the line formed by said back plate.

References Cited in the file of this patent
UNITED STATES PATENTS

| | | |
|---|---|---|
| 966,562 | Knoerzer | Aug. 9, 1910 |
| 1,281,822 | Orr | Oct. 15, 1918 |
| 1,340,076 | Orr | May 11, 1920 |

FOREIGN PATENTS

| | | |
|---|---|---|
| 992,815 | France | July 11, 1951 |